United States Patent [19]

Stermole et al.

[11] Patent Number: 4,483,842
[45] Date of Patent: Nov. 20, 1984

[54] METHOD FOR REMOVING DIBASIC CALCIUM HYPOCHLORITE SCALE

[75] Inventors: David A. Stermole, New Martinsville, W. Va.; Robert B. Simmons, Norton, Ohio

[73] Assignee: PPG Industries, Inc., Pittsburgh, Pa.

[21] Appl. No.: 518,988

[22] Filed: Aug. 1, 1983

[51] Int. Cl.$^3$ .............................................. C01B 11/06
[52] U.S. Cl. .................. 423/474; 134/22.1; 134/22.16; 134/22.17; 134/2
[58] Field of Search ................. 423/474; 134/2, 22.1, 134/22.13, 22.17, 22.16

[56] References Cited

U.S. PATENT DOCUMENTS

| | | | |
|---|---|---|---|
| 888,122 | 5/1908 | Schultze | 423/474 |
| 2,320,635 | 6/1943 | Mericola et al. | 23/86 |
| 2,368,042 | 1/1945 | Robson | 23/86 |
| 2,429,531 | 10/1947 | Soule et al. | 23/86 |
| 2,441,337 | 5/1948 | Sprauer | 23/86 |
| 3,030,177 | 4/1962 | Mohan, Jr. | 23/86 |
| 3,094,380 | 6/1963 | Bruce | 23/86 |
| 4,258,024 | 3/1981 | Hoffer et al. | 423/474 |
| 4,328,200 | 5/1982 | Welch et al. | 423/474 |
| 4,390,512 | 6/1983 | Loehr | 423/474 |

Primary Examiner—John Doll
Assistant Examiner—Steven Capella
Attorney, Agent, or Firm—Irwin M. Stein

[57] ABSTRACT

Dibasic calcium hypochlorite scale present on the surfaces of process equipment, e.g., process vessels, used for the manufacture of neutral calcium hypochlorite is removed chemically by controllably adding chlorine to the process liquor under conditions of agitation while maintaining the pH of the process liquor at at least 7, e.g., from about 7 to about 10.5, thereby to solubilize the dibasic calcium hypochlorite scale without producing substantial amounts of elemental chlorine. In a preferred embodiment, the process liquor in the process equipment containing the dibasic calcium hypochlorite scale is forwarded to a further process vessel containing other less alkaline process liquor to which the chlorine is controllably added. The resulting hydrochloric acid-containing process liquor is recycled to the process equipment containing the dibasic scale and this procedure continued until the desired amount of dibasic calcium hypochlorite scale is solubilized.

10 Claims, 1 Drawing Figure

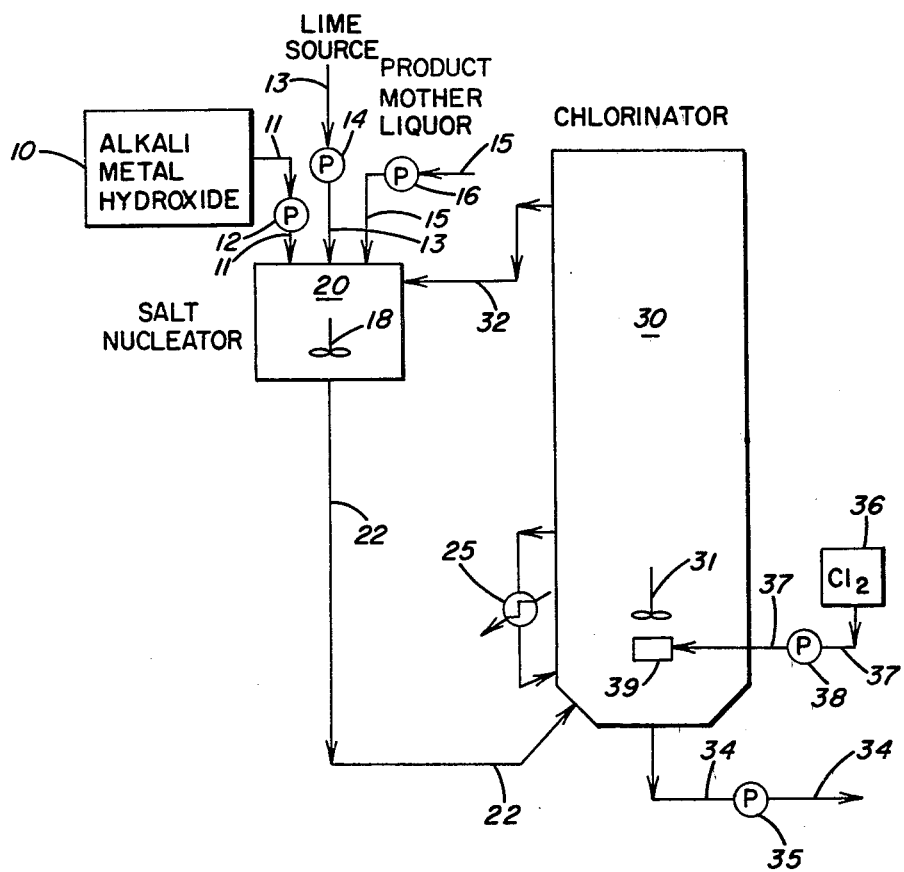

METHOD FOR REMOVING DIBASIC CALCIUM HYPOCHLORITE SCALE

DESCRIPTION OF THE INVENTION

The present invention relates to the manufacture of neutral calcium hypochlorite. This material enjoys a major portion of the market for available chlorine compounds, aside from chlorine itself, because it is the cheapest and most stable solid composition known which delivers all of its available chlorine immediately on contact with oxidizable material. Calcium hypochlorite compositions containing at least 65 percent of available chlorine have been on the market for many years and are used primarily as commercial bleaching and sanitizing agents. Such compositions are used particularly for disinfecting swimming pool water.

A variety of processes for manufacturing calcium hypochlorite from lime and alkali metal hydroxide, such as sodium hydroxide, have been proposed. Some of these processes, such as those described in U.S. Pat. Nos. 2,320,635, 2,368,042, 3,094,380, 4,258,024 and 4,328,200, utilize dibasic calcium hypochlorite as the source of lime which is chlorinated to produce calcium hypochlorite. That reaction can be depicted by the following balanced equation:

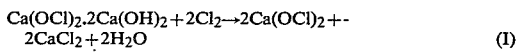

In other described processes for producing neutral calcium hypochlorite, such as U.S. Pat. No. 4,390,512, the process conditions used may favor the formation of dibasic calcium hypochlorite.

Process liquor temperatures used in the preparation of calcium hypochlorite are typically less than 35° C., e.g., between about 10° C. and 30° C., to avoid decomposition of the hypochlorite product. Dibasic calcium hypochlorite is only slightly soluble in water at such temperatures. Consequently, in process equipment wherein the conditions otherwise favor the formation of dibasic calcium hypochlorite, crystals of this salt will form and deposit on the surfaces of such equipment. The scale can adhere tightly to such surfaces and grow to the point where its removal is required. Removal of dibasic calcium hypochlorite scale has been accomplished mechanically, e.g., by hydroblasting the scale away from the surfaces to which it adheres. The scale which is thereby removed can be wet milled, and the milled dibasic calcium hypochlorite reintroduced into the process as a source of lime for the manufacture of neutral calcium hypochlorite.

Removal of dibasic calcium hypochlorite scale chemically by contacting the scale with acid, e.g., hydrochloric acid, under acidic conditions causes the generation of elemental chlorine by the acid-calcium hypochlorite reaction depicted by the following overall balanced equation:

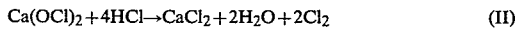

Such elemental chlorine can readily escape as chlorine gas, which would require additional precautions and equipment to avoid release thereof to the environment. Typically, evolved chlorine gas is collected and conveyed to a scrubbing column where it is neutralized with an alkaline reagent, e.g., sodium hydroxide. The loss of chlorine in this manner also reduces the amount of calcium hypochlorite which is potentially recoverable as product from the dibasic calcium hypochlorite scale.

Finally, acidic conditions in the reaction of hydrochloric acid with dibasic calcium hypochlorite also favor the formation of calcium chlorate. If the resulting aqueous solution containing the calcium chlorate is recycled to another part of the calcium hypochlorite manufacturing process, the calcium chlorate present therein can increase the level of this impurity within the calcium hypochlorite product. Further, the formation of calcium chlorate also reduces the amount of calcium hypochlorite potentially recoverable by the process of the present invention.

It has now been discovered that dibasic calcium hypochlorite scale can be removed chemically from process equipment used in the manufacture of neutral calcium hypochlorite without producing substantial amounts of chlorine gas. More particularly, the dibasic calcium hypochlorite scale deposited on the surfaces of such process equipment is removed by adding hydrogen ions to the process liquor in contact with the dibasic calcium hypochlorite scale under conditions of agitation while maintaining the pH of the process liquor at at least 7, and preferably between a pH of 7 and 10.5.

More particularly, it has been found that by establishing a circulating aqueous alkaline medium between two process vessels of the calcium hypochlorite manufacturing process (at least one of which contains dibasic calcium hypochlorite scale) and by adding hydrogen ions controllably to said circulating medium, e.g., by adding chlorine or hydrogen chloride therein, so as to control the pH of the circulating medium between at least 7 and 10.5 the dibasic calcium hypochlorite scale in the process vessel can be solubilized.

Still more particularly, in the process of preparing calcium hypochlorite an alkaline aqueous process stream is introduced into a first vessel within which dibasic calcium hypochlorite scale is present because conditions exist for such scale forming therein. The alkaline process liquor from the first vessel is forwarded to a second vessel containing process liquor less alkaline than the process liquor in the first vessel. Process liquor in the second vessel is both recycled to the first vessel and removed and forwarded to a further stage in the process.

In accordance with the present invention, the feed of the aqueous alkaline process stream to the first vessel and the process liquor forwarded to the further stage in the process are discontinued. The process liquor forwarded from the first vessel to the second vessel and the process liquor from the second vessel recycled directly to the first vessel thereby forms a circulating homogeneous aqueous alkaline medium of substantially the same pH. Simultaneously, hydrogen ions, e.g., chlorine or hydrogen chloride, are controllably added to the circulating alkaline medium so as to maintain the pH thereof at between at least 7 and about 10.5, thereby to solubilize the dibasic calcium hypochlorite scale. When the desired amount of scale is solubilized, all process streams are resumed and the introduction of hydrogen ions discontinued unless the introduction of such hydrogen ions, e.g., chlorine forms a part of the normal manufacturing process.

In a contemplated embodiment of the present process, the process liquor in the vessel containing the dibasic calcium hypochlorite scale (the first vessel) is forwarded to a second vessel containing a process liquor which is less alkaline than the first vessel process liquor and which is recycled to the first vessel, thereby to establish a circulating aqueous alkaline medium. The average pH of the process liquor in the first vessel is typically in the range of from about 10 to 14, a condition which favors the formation and/or deposition of dibasic calcium hypochlorite onto the surfaces of the first vessel. The average pH of the process liquor in the second vessel is usually less than the average pH of the process liquor in the first vessel but is such that the resulting circulating aqueous alkaline medium has a pH of at least about 7. Thereafter, chlorine is controllably introduced with agitation into the circulating aqueous alkaline medium while the pH thereof is maintained at at least 7, e.g., from at least 7 to about 10.5, until the desired amount of dibasic calcium hypochlorite scale present on the surfaces of the first vessel is solubilized. In this manner, the dibasic calcium hypochlorite scale is removed from the surface of process equipment on which it is found without producing substantial amounts of elemental chlorine gas.

BRIEF DESCRIPTION OF THE DRAWING

The specific features and advantages of the present invention will become more clear from the following detailed description made with reference to the drawing, which is a schematic flow diagram of an embodiment of the present invention.

DETAILED DESCRIPTION OF THE INVENTION

The presence of dibasic calcium hypochlorite (hereinafter referred to as "dibasic" or "dibasic salt") scale in process equipment used for the production of neutral calcium hypochlorite can present operational problems in the functioning of such equipment as well as be the source of a potential loss of calcium values from the system. In the former, scale build-up can result in the plugging of process lines and significant loss in working volume in process vessels. In the latter, dibasic calcium hypochlorite which could be converted to neutral calcium hypochlorite product is potentially lost. Removal of the scale mechanically followed by wet milling so that the dibasic salt can be recycled within the process requires extra equipment, adds to the cost of the process and is time consuming.

The process of the present invention provides a chemical means for dibasic scale removal which utilizes readily available materials from the calcium hypochlorite manufacturing process and recovers directly calcium hypochlorite that can be readily assimilated within the process. Moreover, the present process does not produce significant amounts of free chlorine.

The process of the present invention can be illustrated by reference to a neutral calcium hypochlorite manufacturing process wherein conditions permit dibasic calcium hypochlorite scale to deposit on the surfaces of certain process equipment. For example, the manufacturing process described in U.S. Pat. No. 4,328,200 is one in which dibasic calcium hypochlorite is used as the source of lime. In U.S. Pat. No. 4,390,512, process conditions favor the formation and/or deposition of dibasic calcium hypochlorite. In the processes described in the aforementioned two U.S. patents, the arrangement of vessels depicted in the attached drawing is found.

Referring now to the drawing, there is shown salt nucleator 20 containing agitator means 18. An alkali feed, e.g., alkali metal hydroxide such as sodium hydroxide or potassium hydroxide, from storage vessel 10 is forwarded by feed line 11 to salt nucleator vessel 20. Pump 12 in feed line 11 is used to control the flow of alkali metal hydroxide.

A source of lime is introduced into salt nucleator 20 by means of feed line 13. Pump 14 controls the feed of the lime source. The lime source introduced into salt nucleator 20 can be any source of lime commonly used in the manufacture of neutral calcium hypochlorite, such as dibasic calcium hypochlorite, lime, milk of lime etc. The lime used to prepare the lime source preferably contains a minimum amount of impurities. Preferably, the lime contains between about 90 and about 97 percent by weight of active lime, e.g., calcium hydroxide. The lime source can be combined with the alkali metal hydroxide and the combined reactants delivered to salt nucleator 20 through a common feed line.

Also shown in the drawing is feed line 15 containing pump 16 for introducing an aqueous salt solution saturated with calcium, sodium, hypochlorite and chloride ions into salt nucleator 20, e.g., product mother liquor. In accordance with U.S. Pat. Nos. 4,328,200 and 4,390,512, the aqueous salt solution added to vessel 20 can be used to dilute the alkali metal hydroxide introduced into vessel 20 and to provide a sufficient amount of calcium and chloride ions to react with substantially all of the unreacted alkali metal hydroxide introduced into vessel 20 so that substantially no unreacted sodium hydroxide (as such) is forwarded by means of feed line 22 to chlorinator 30.

The aqueous diluting salt solution introduced into salt nucleator 20 can be obtained from one or more sources. In accordance with one embodiment of the process, mother liquor recovered from the aqueous product slurry rich in calcium hypochlorite crystals can be recycled to salt nucleator 20, as shown by feed line 15. In another embodiment, mother liquor recovered from the aqueous by-product slurry rich in sodium chloride crystals can be recycled to salt nucleator 20. This by-product mother liquor has substantially the same composition as that of the product mother liquor. In a further embodiment, chlorinator slurry is withdrawn from the chlorinator and recycled to salt nucleator 20 by means of feed line 32. In a still further embodiment (as shown in the drawing) more than one source of aqueous salt solution is used to dilute the alkali metal hydroxide feed, i.e., recycle mother liquor (feed line 15) and recycled chlorinator slurry liquor (feed line 32).

The aforesaid mother liquors and chlorinator slurry are substantially saturated with calcium hypochlorite and sodium chloride at the temperatures of operation. Thus, they are substantially saturated with calcium ion, hypochlorite ion, sodium ion and chloride ion. The chlorinator slurry recycled to vessel 20 will also contain some solid sodium chloride and calcium hypochlorite as the chlorinator typically contains a suspension of such solids in that slurry.

Salt nucleator 20 is a conventional tank or other suitable vessel and usually has a volume substantially smaller than chlorinator vessel 30. Typically, the volume of the chlorinator will be 10 to 200, e.g., 15 to 40, times as large as the volume of vessel 20. As indicated, vessel 20 is equipped with agitator means 18 so that the lime source, alkali metal hydroxide and aqueous diluting slt solution (from whatever source) charged thereto can be readily admixed to form a well-stirred homogeneous mixture in a relatively short time. Unlike the agitator in chlorinator 30, wherein mixing is conducted in a moderate fashion to avoid breaking the more fragile calcium hypochlorite crystals and avoid breakthrough of unreacted elemental chlorine, mixing in vessel 20 can be performed vigorously to achieve rapid admixing of the feed streams thereto to form a homogeneous mixture, i.e., an aqueous alkaline salt solution. The pH of this solution is typically in the range of from about 10 to 14.

The temperature within salt nucleator vessel 20 is typically about room temperature, e.g., between about 15° C. and 35° C., usually between about 20° C. and 30° C. The temperature is not controlled to any particular level; but, is a function of the temperature and quantity of the feed streams charged to it and the surrounding ambient temperature. Thus, the temperature of the alkaline salt solution in salt nucleator 20 is allowed to reach whatever temperature equilibrium conditions dictate.

The aqueous homogeneous salt solution present in salt nucleator vessel 20 is removed therefrom and forwarded by flow line 22 to chlorinator 30. Elemental chlorine from a source 36 is forwarded by means of flow line 37 containing pump 38 into chlorinator 30 in a manner to effectively disperse the chlorine within the chlorination zone of the chlorinator and effect complete reaction of the chlorine with the alkali content, i.e., the hydroxyl ion concentration, e.g., calcium hydroxide, within the chlorinator. As shown, chlorine is introduced beneath the impeller of agitator 31 through distribution device 39 such as a nozzle or dip tube and is thereby effectively dispersed within the slurry present in the chlorinator.

The temperature of the reaction mixture within the chlorinator is typically maintained at less than 35° C., e.g., between about 10° C. and about 30° C., preferably between about 15° C. and about 20° C. by employing auxiliary cooling means, e.g., indirect heat exchangers. Such heat exchangers can be located within the chlorinator or can be external thereto, e.g., by the use of side arm cooler 25.

A product stream comprising sodium chloride crystals, neutral calcium hypochlorite particles and suspending chlorinator mother liquor is removed from chlorinator 30 by means of flow line 34 which contains pump 35 for controlling the flow thereof. As described in the art of producing neutral calcium hypochlorite, the product stream is forwarded to a classification zone wherein it is separated into a first aqueous slurry rich in calcium hypochlorite particles and a second aqueous slurry rich in sodium chloride crystals. The mother liquor of this first aqueous product slurry is separated from the calcium hypochlorite particles and this product mother liquor recycled to one or more steps of the neutral calcium hypochlorite manufacturing process. As shown, one such recycle stream can be the product liquor feed stream 15 introduced into salt nucleator vessel 20.

In the accompanying drawing, dibasic calcium hypochlorite scale forms on the surfaces of salt nucleator vessel 20 either because of the use of dibasic calcium hypochlorite as the lime source or because the conditions therein, e.g., pH, temperature and the availability of the appropriate cation and anion species, favor formation of the dibasic salt. The average pH of the alkaline salt solution in salt nucleator vessel 20 is usually higher than the pH of the chlorinator slurry in chlorinator 30 due to the introduction of alkali metal hydroxide and the lime source therein and the relatively smaller volume of vessel 20 compared to chlorinator 30.

In the preparation of neutral calcium hypochlorite using the arrangement of vessels depicted in the accompanying drawing, a source of lime and alkali metal hydroxide are continuously added to salt nucleator 20 wherein a homogeneous alkaline solution is formed. An aqueous salt solution saturated with calcium, hypochlorite, sodium, and chloride ions is continuously added to vessel 20 either by recycling chlorinator slurry (feed line 32), product or by-product salt mother liquor, or both chlorinator slurry and product mother liquor and/or salt mother liquor. This homogeneous alkaline salt solution is forwarded by means of flow line 22 into chlorinator 30. Chlorine is introduced into chlorinator 30 from a chlorine source 36 by means of chlorine feed line 37 and further particles of neutral calcium hypochlorite and sodium chloride crystals are formed in the chlorinator. A portion of the chlorinator slurry is recycled continuously to salt nucleator 20 and a product stream of calcium hypochlorite particles and sodium chloride crystals continuously removed from the chlorinator by means of flow line 34.

In accordance with the process of the present invention and particularly with regard to the embodiment described in the accompanying drawing, the flow of alkali metal hydroxide and lime source reactant feed [and recycle product mother liquor (if used)] into vessel 20 are discontinued. In addition, the removal of the aqueous product stream from the chlorinator 30 is also discontinued. The alkaline solution present in vessel 20 is continuously forwarded to chlorinator 30 and chlorinator slurry is continuously recycled to vessel 20, thereby establishing a circulating aqueous alkaline medium of substantially the same pH and composition. The pH of the circulating aqueous medium is at least 7 and, typically, is between about 7 and about 10.5, more typically between about 7.7 and 10 and preferably between about 9 and 10, e.g., about 9.5.

Chlorine is slowly and controllably introduced into the circulating aqueous alkaline medium, e.g., by introducing chlorine into the chlorinator by means of existing feed lines, while maintaining the pH of the circulating aqueous alkaline medium at from at least 7 to about 10.5 until the desired amount of dibasic calcium hypochlorite scale present on the surfaces of salt nucleator 20 is solubilized. Preferably, the chlorine is introduced for as long as required to remove substantially all of the dibasic scale in the salt nucleator.

Upon addition of chlorine to the circulating aqueous alkaline medium, the chlorine is converted to hydrochloric acid which solubilizes the dibasic scale in accordance with the overall following balanced equation:

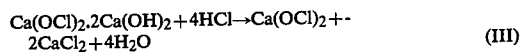

$$Ca(OCl)_2 \cdot 2Ca(OH)_2 + 4HCl \rightarrow Ca(OCl)_2 + 2CaCl_2 + 4H_2O \qquad (III)$$

Once the desired amount of dibasic scale has been removed from the surfaces of salt nucleator 20, the neutral calcium hypochlorite manufacturing process is resumed by reintroducing the alkali metal hydroxide and lime source (and product mother liquor) into salt nucleator 20, and resuming the withdrawal of the calcium hypochlorite-containing product stream from the chlorinator.

The introduction of chlorine into the circulating aqueous medium can be achieved by any convenient method. Preferably, existing piping is used so that the chlorine is introduced into the chlorinator and hence into the circulating aqueous medium in the same manner as chlorine is introduced into the chlorinator during the production of neutral calcium hypochlorite. In performing the process of the present invention, the flow of chlorine to the chlorinator can be stopped when the feed streams to the salt nucleator are halted and then resumed following establishment of the homogeneous circulating aqueous alkaline medium between the salt nucleator and chlorinator; or, the flow of chlorine can be reduced to the predetermined flow rate required to maintain the pH of the circulating aqueous alkaline medium at at least 7 when the feed of alkali metal hydroxide and lime source are discontinued.

Although the present invention has been particularly exemplified utilizing chlorine added to the circulating aqueous alkaline medium (to form hydrochloric acid), one skilled in the art will readily recognize that any source of hydrogen ions (acid protons) can be introduced into the circulating aqueous medium to provide a source of hydrogen ions to react with the solubilized dibasic calcium hypochlorite. The source of acid protons can be provided by any suitable inorganic mineral acid or material which forms the acid, i.e., elemental halogen, e.g., chlorine. Inorganic mineral acids that can be used include: sulfuric acid, nitric acid, phosphoric acid, hydrogen halides, e.g., hydrochloric acid, and the hypohalo acids, e.g., hypochlorous acid. Preferably, hydrochloric acid, hypochlorous acid or chlorine are used to provide the source of acid protons so as not to introduce anions foreign to the calcium hypochlorite process.

The amount of hydrogen ions, e.g., hydrochloric acid, added to the circulating aqueous alkaline medium will depend, of course, on the amount of dibasic calcium hypochlorite scale present on the process equipment, e.g., salt nucleator 20, that requires removal or is to be removed. The amount of hydrogen ions added will be in substantially stoichiometric amounts, i.e., 90 to 110 percent of the stoichiometric amount required by balanced equation III. This equation is based on the use of hydrochloric acid and, of course, if a source of hydrogen ions other than such acid is used, equation III would be modified accordingly.

The rate at which hydrogen ions are added to the circulating aqueous alkaline medium will vary and will depend on the pH or pH range at which the aqueous medium is to be maintained, the rate at which the dibasic scale is solubilized, and the relative concentrations of the hydrogen ion source. The higher the concentration of acid—the lower the addition rate and vice versa. Monitoring the pH of the circulating aqueous medium is readily accomplished by use of an industrial type pH meter. The meter can be associated with electronic reading and recording means for continuous reading and printing of the pH conditions sensed by the meter within the vessel. The electronic sensing means can also be connected to a pneumatic control system which automatically operates a valve in the acid proton feed line, i.e., the mineral acid (hydrochloric acid) or halogen (chlorine) feed line.

The acid, e.g., hydrochloric acid, can be of any suitable concentration. For hydrochloric acid, the concentration can vary from 0.01 to 36 weight percent. If the acid is very dilute, a large amount of water is added to the system which adds to the evaporation heat load during recovery of the product in the calcium hypochlorite manufacturing process. Typically, the water balance in the process is carefully regulated and, therefore, moderately concentrated or concentrated acids are used in the practice of the present invention. If the acid used is highly concentrated, e.g., anhydrous hydrogen chloride, care must be observed to add the same slowly and with agitation to avoid areas of localized concentrated acid. Typically, the volume of the circulating aqueous alkaline medium is large enough to provide sufficient capacity to absorb concentrated acid readily without generating localized areas of high acid concentration. When the amount of water added to the calcium hypochlorite manufacturing process is not closely controlled, acid, e.g., hydrochloric acid, having a concentration within the range of from about 5 to 20 weight percent will usually be used.

As described, the source of acid protons added to the circulating aqueous alkaline medium can be introduced by slowly bubbling halogen, e.g., chlorine, gas into the solution. Chlorine, for example, will react with water to form hypochlorous acid and hydrogen chloride, which furnishes the desired acid protons. Use of halogen, e.g., chlorine, gas in this manner is suitable principally when the process equipment is a fairly large vessel which is filled with the aqueous circulating medium. The gas is introduced near the bottom of the vessel very slowly, thereby giving the halogen gas time to dissolve within the alkaline solution and form the corresponding acids. Although halogens other than chlorine can be used, e.g., bromine and iodine, chlorine is the preferred halogen because of cost and compatibility with chemical species already in the process. As used in the herein specification and claims, the term hydrochloric acid is intended to mean and include the in situ generation of hydrochloric acid by the introduction of chlorine gas into the circulating aqueous alkaline medium.

As indicated in equations I and III, the reaction of dibasic calcium hypochlorite with hydrochloric acid or chlorine results in the production of calcium chloride. This salt can represent an objectionable impurity in the neutral calcium hypochlorite product. If it is found that the amount of calcium chloride generated by the reaction of solubilized dibasic calcium hypochlorite with the acid source is too high, sodium hypochlorite can be added to the resulting salt solution to form calcium hypochlorite and sodium chloride in accordance with the following art-recognized equation:

$$2NaOCl + CaCl_2 \rightarrow Ca(OCl)_2 + 2NaCl \qquad (IV)$$

The sodium hypochlorite can be readily produced by the reaction of chlorine with sodium hydroxide. The amount of sodium hypochlorite added to the calcium chloride-containing solution should be in amounts substantially stiochiometric to the amount of calcium chloride generated in the scale removal process. The mole ratio of sodium hypochlorite to such calcium chloride can range between about 1.5-2.5:1, more typically between 1.9:1 and 2.1:1.

Although the present process has been described with reference to specific details of certain embodiments thereof, it is not intended that such detail should be regarded as limitations upon the scope of the invention except as and to the extent that they are included in the accompanying claims.

We claim:

1. In the process of preparing calcium hypochlorite by reaction of a source of lime, alkali metal hydroxide and chlorine, wherein an alkaline aqueous process stream containing a source of lime is introduced into a first vessel and wherein the conditions in said first vessel are such that dibasic calcium hypochlorite is deposited on the surface of said first vessel, thereby forming a scale of dibasic calcium hypochlorite thereon, wherein process liquor is removed from said first vessel and forwarded to a second vessel in the process containing process liquor less alkaline than the process liquor in the first vessel, and wherein process liquor from the second vessel is recycled to the first vessel and also removed therefrom for further treatment in the process, the improvement which comprises removing dibasic calcium hypochlorite scale from the first vessel by the steps of:
(a) discontinuing introducing said lime-containing alkaline process stream into said first vessel and discontinuing removing process liquor from the second vessel for further treatment in the process,
(b) continuing to forward process liquor from the first vessel to the second vessel and to recycle process liquor from the second vessel to the first vessel, thereby establishing a circulating aqueous alkaline medium of substantially the same pH,
(c) introducing hydrogen ions into the circulating aqueous alkaline medium while maintaining the pH thereof at at least 7 until the desired amount of dibasic calcium hypochlorite scale present on the surfaces of the first vessel is solubilized, and thereafter
(d) resuming the introduction of said lime-containing alkaline process stream into said first vessel and the removal of process liquor from said second vessel for further treatment in the process.

2. The process of claim 1 wherein the pH of the process liquor in the first vessel is from about 10 to 14.

3. The process of claim 2 wherein the hydrogen ions introduced into the circulating aqueous alkaline medium is provided by introducing chlorine or hydrogen chloride therein.

4. The process of claim 3 wherein the pH of the circulating aqueous alkaline medium is maintained at between at least 7 and about 10.5.

5. The process of claim 2 wherein alkali metal hydroxide is also introduced into the first vessel.

6. In the process of preparing calcium hypochlorite by reaction of a source of lime, alkali metal hydroxide and chlorine, wherein an aqueous alkaline process stream comprising the source of lime or alkali metal hydroxide, or both the source of lime and alkali metal hydroxide is introduced into a first vessel, thereby to form a first aqueous alkaline salt solution having a pH of from about 10 to about 14, and first alkaline salt solution is forwarded to a second vessel in the process containing process liquor less alkaline than the aqueous alkaline salt solution in the first vessel, wherein process liquor from the second vessel is recycled to the first vessel and also removed therefrom for further treatment in the process, and wherein the conditions in said first vessel are such that dibasic calcium hypochlorite is deposited on the surfaces of said first vessel, thereby forming a scale of dibasic calcium hypochlorite thereon, the improvement which comprises removing dibasic calcium hypochlorite scale from the first vessel by the steps of:
(a) discontinuing introducing said aqueous alkaline process stream into said first vessel and discontinuing removing process liquor from the second vessel for further treatment in the process,
(b) continuing to forward first aqueous alkaline salt solution from the first vessel to the second vessel, and continuing to recycle process liquor from the second vessel to the first vessel, thereby to establish a circulating aqueous alkaline medium of a pH of from at least 7 to about 10.5,
(c) introducing hydrogen ions into the circulating aqueous alkaline medium while maintaining the pH thereof at from at least 7 to about 10.5 until the desired amount of dibasic calcium hypochlorite scale present on the surfaces of the first vessel is solubilized, and thereafter
(d) resuming the introduction of said aqueous alkaline process stream to said first vessel and the removal of process liquor from said second vessel for further treatment in the process.

7. The process of claim 6 wherein the hydrogen ions introduced into the circulating aqueous alkaline medium is provided by introducing chlorine or hydrogen chloride therein.

8. The process of claim 7 wherein the pH of the circulating aqueous alkaline medium is controlled at a pH of between about 7.7 and 10.

9. In the process of preparing calcium hypochlorite by reaction of a source of lime, alkali metal hydroxide and chlorine, wherein the source of lime and aqueous alkali metal hydroxide are introduced into a first vessel, thereby to form a first aqueous alkaline salt solution, and first alkaline salt solution is forwarded to a second vessel into which chlorine is introduced, thereby to chlorinate the alkali values in the first alkaline solution and produce a calcium hypochlorite-containing mother liquor, the average pH of the alkaline solution in the first vessel being greater than the pH of the mother liquor in the second vessel, wherein an aqueous calcium hypochlorite-containing product stream is removed from said second vessel and process liquor from said second vessel is recycled to said first vessel, and wherein the conditions in said first vessel are such that dibasic calcium hypochlorite is deposited on the surfaces of said first vessel, thereby forming a scale of dibasic calcium hypochlorite thereon, the improvement which comprises removing dibasic calcium hypochlorite scale from the first vessel by the steps of:
(a) discontinuing the flow of the lime source and alkali metal hydroxide into the first vessel, and discontinuing the removal of aqueous product stream from the second vessel,
(b) continuing to forward aqueous alkaline salt solution from the first vessel to the second vessel and recycle process liquor from the second vessel to the first vessel, thereby establishing a circulating aqueous alkaline medium of substantially the same pH,
(c) introducing chlorine into the circulating aqueous alkaline medium while maintaining the pH thereof at from at least 7 to about 10.5 until the desired amount of dibasic calcium hypochlorite scale present on the surfaces of the first vessel is solubilized, and, thereafter
(d) resuming introduction of the source of lime and alkali metal hydroxide into said first vessel and resuming removal of aqueous product stream from said second vessel.

10. The process of claim 9 wherein the pH of the circulating aqueous alkaline medium is controlled at a pH of between about 9 and 10.

* * * * *